Nov. 3, 1953               H. J. SMITS              2,658,115
PHONOGRAPH PICKUP
Filed June 22, 1950                                     2 Sheets-Sheet 1
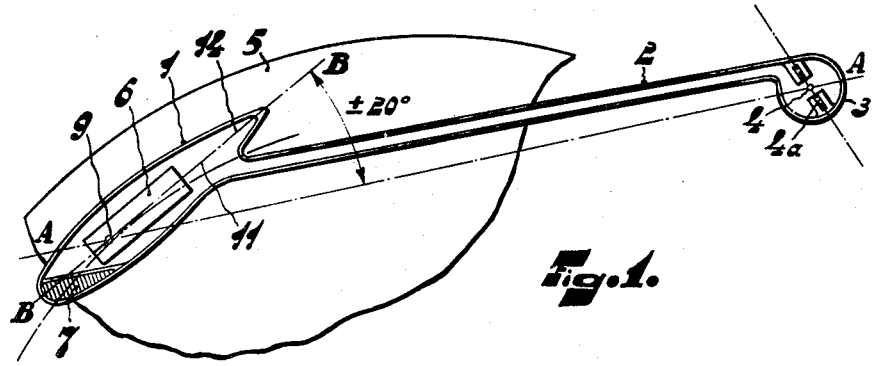
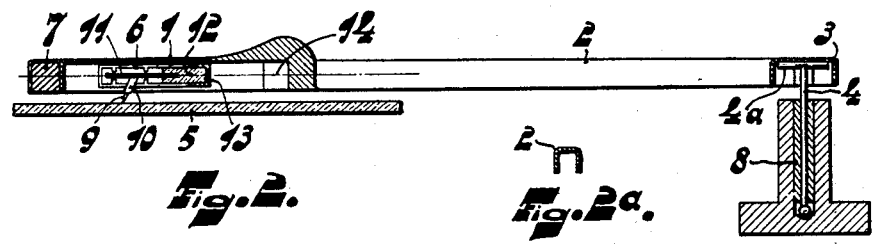
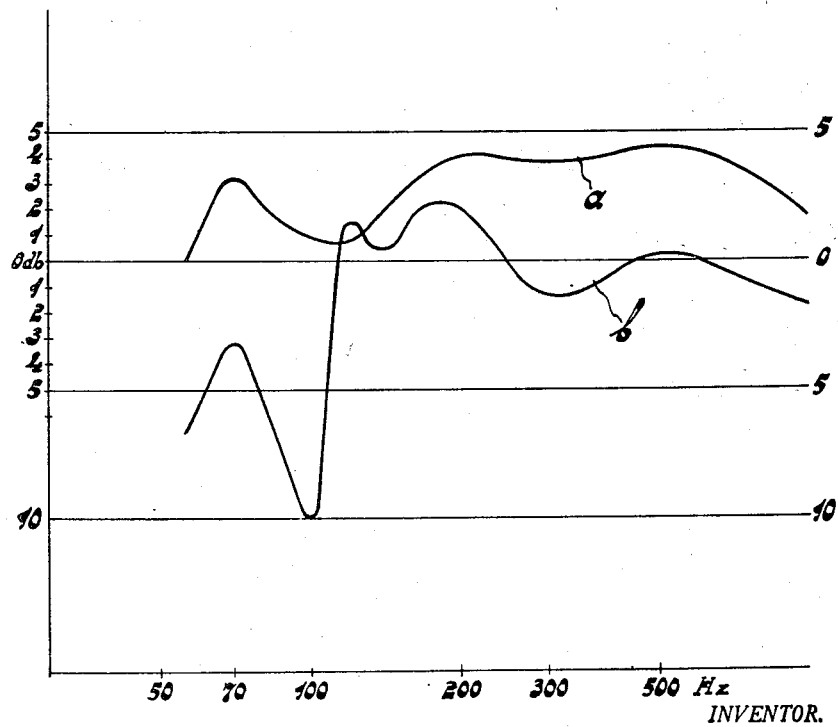
INVENTOR.
HUBERTUS JAN SMITS
BY
AGENT Nov. 3, 1953
H. J. SMITS
2,658,115
PHONOGRAPH PICKUP
Filed June 22, 1950
2 Sheets-Sheet 2
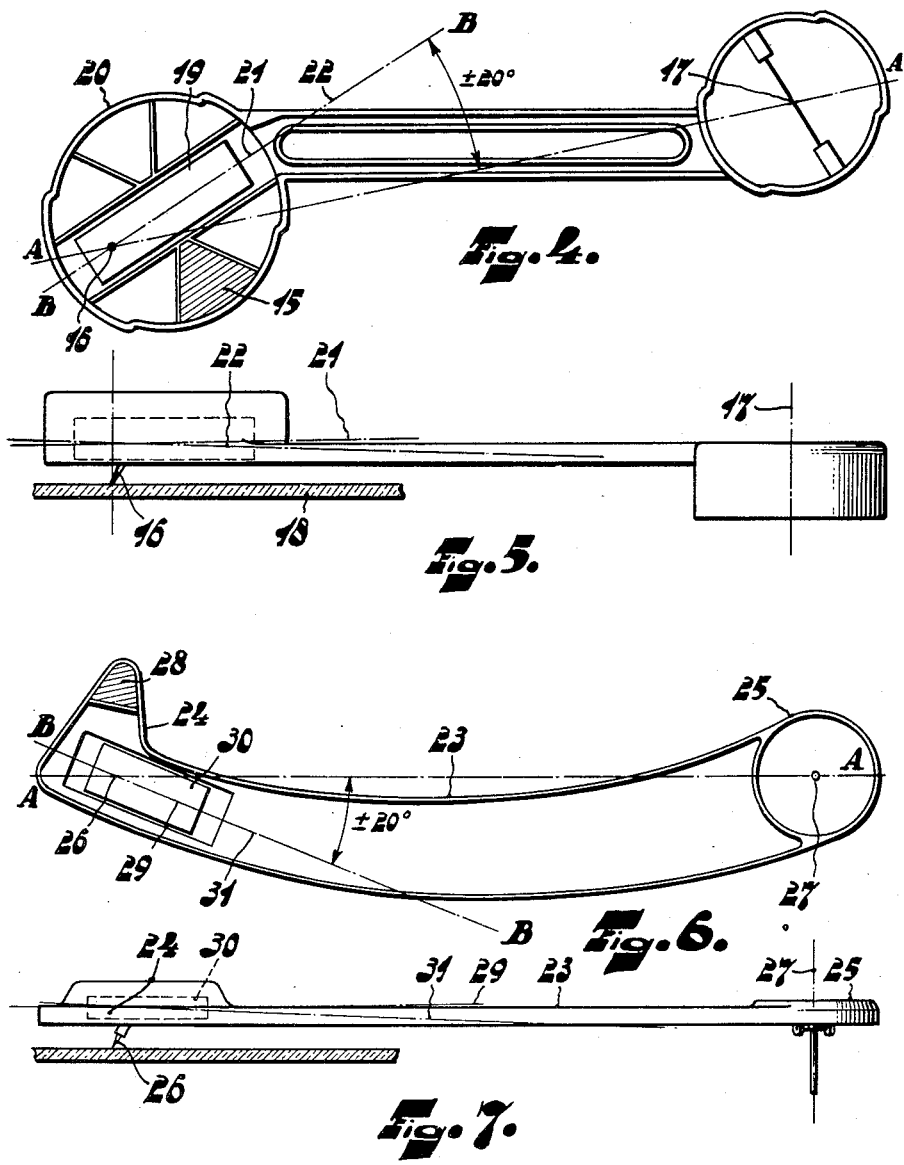
INVENTOR.
HUBERTUS JAN SMITS
BY
AGENT Patented Nov. 3, 1953

2,658,115

UNITED STATES PATENT OFFICE 2,658,115

PHONOGRAPH PICKUP

Hubertus Jan Smits, Eindhoven, Netherlands, assignor to Hartford National Bank and Trust Company, Hartford, Conn., as trustee Application June 22, 1950, Serial No. 169,617

Claims priority, application Netherlands July 9, 1949

2 Claims. (Cl. 179—100.41)

The invention relates to phonograph pick-ups, the flat head of which is supported by an elongated arm by which the head is connected to a foot which is adapted to rotate on a pivot at right angles to the record to be played. The term "pick-up" is to be understood hereinafter to mean the combination of the head of the pick-up and the arm, since the foot is not essential from the point of view of the following considerations. The said pivot will be briefly referred to as the "pivot."

The invention relates in particular to pick-ups, in which the plane relative to which the needle oscillates symmetrically in a lateral direction and which is at right angles to the plane of the record is at an angle of less than 30°, for example about 20°, with the plane passing through the pivot and the needle point. This has the advantage that when the record is played the tangent line to the unmodulated groove at any point of scan is located substantially in the above-mentioned plane of symmetry. With a view to ensuring minimum wear of the record and minimum distortion in reproduction, such pick-ups are at present used almost exclusively. While maintaining the usual length of the arm, the required result may be obtained by a suitably chosen arrangement of the pick-up head in relation to the direction of length of the arm and/or by its form, for example, by the use of a curved arm.

The conventional forms of pick-ups of the aforesaid kind have a limitation in that they are of heavy construction with the object of obviating lateral movements of the arm in a plane normal to the spindle due to the needle vibration. This is particularly as far as the arm is concerned, so that springs and/or counterweights have to be used in order to ensure optimum minimum needle pressure. This results in such a load on the bearing of the pivot that it is necessary to use comparatively expensive bearings with a small amount of play, such for example as ball bearings.

Such pick-ups have a further limitation in that the frequency characteristic response curve falls off in the range of the lower frequencies.

The pick-up according to the invention is characterized in that its mass lies primarily in its head, its weight is less than about 35 g., the mass distribution is such that the masses on either side of the plane passing through the pivot and the needle point are at least substantially equal and in that the rigidity against torsion of the arm in consequence of the needle movement is such that the mechanical resonance frequency of the pick-up which is also determined thereby (referred to hereinafter as the torsion resonance frequency) is below about 200 C. P. S. The use of a total weight of less than about 35 g. requires the use of a pick-up head of smaller weight. This is possible if a piezo-electric element or a magnetic circuit using a permanent magnet having a $(BH)_{max}$ value of more than $3.10^6$ is used.

The combination of the aforesaid features ensures a pick-up in which the said limitations of the known pick-ups are not inherent and which moreover has several advantages, owing to which not only a very simple and cheap construction but also a very satisfactory frequency characteristic response curve is obtainable.

Since the mass of the pick-up is mainly in the head, a maximum moment of inertia about the pivot will be obtained. Since the mass of the foot is symmetrically disposed around the pivot, this mass does not essentially interfere with the effect of the moment of inertia which is of importance in this case. This mass also has no effect on the value of the needle pressure for the same reason. The said mass distribution of head and arm enables lateral movements of the arm to be sufficiently restricted, notwithstanding the small total weight of both being less than 35 g. Moreover this result can be obtained without the use of springs or counterweights and this enables the use of a comparatively simple and cheap bearing, for example a slide bearing for the pivot, since it is sufficient if the weight of the pick-up gives a needle pressure of a maximum of about 25 g., which is required for minimum wear of the record.

The mass distribution on either side of the plane passing through the pivot and the needle point, as said above, may ensure that the axis about which the pick-up is torsioned due to the lateral needle motion (torsion axis) coincides, at least approximately, with the axis of vibration of the armature. This approximates to the condition, under which the needle motion is transmitted to the transformation system as effectively as possible. In the frequency characteristic response curve this becomes manifest in the range of the lower frequencies between about 500 and 50 C. P. S., since the output voltage in this range is materially higher than in the corresponding case without the said mass distribution. The difference is not higher than about 5 decibels and, on an average, about 3 decibels. The effect of the mass distribution on the higher frequencies is practically unnoticeable, since the mass of the pick-up is such that, owing to the comparatively small needle amplitudes occurring at these frequencies, the effect of an incorrect position of the torsion axis on the transmission of the needle motion to the system spindle is negligible.

In view of the foregoing it must be borne in mind that the favourable effect of the mass distribution just mentioned can be ensured only by a suitable choice of the rigidity against torsion of the pick-up arm, since this also determines the position of the torsion axis. It has been found that the use of an arm of such low rigidity that a torsion resonance frequency of less than 200 c. p. s. results is required to approximate the ideal condition sought by the invention, as stated above.

The resonance frequency of the pick-up is known to be determined both by the rigidity and the mass of the constituent components, primarily of the arm and the head. Since the mass primarily located in the head is already determined by the comparatively slight total weight of head and arm, realization of a low torsion resonance frequency requires low rigidity of the system against torsion. Since due to the presence of the mechanico-electrical transformation system the torsion rigidity of the head has a value such that the required low torsion rigidity of the pick-up cannot be ensured thereby, the above is tantamount to the requirement that the necessary low torsion rigidity should be ensured by the arm and this requirement may be fulfilled by suitable choice of material and dimensions and also of the form of the arm, which weighs only few grams. In view thereof it should be borne in mind that the rigidity of the arm with which it resists the other stresses to which it is subject, for example bending as a result of the mass of the head, must not be so low as to render the arm incapable of supporting the head any longer.

The arm is conveniently made of a thermo-setting or thermo-plastic synthetic resin.

Since the torsion resonance frequency of the pick-up according to the invention is less than 200 c. p. s., there is in addition to the aforesaid advantage on the basis of the combination with a correct mass distribution the advantage that the energy accumulated in the resonance range in the arm of the pick-up is comparatively slight and this assists in ensuring that the needle point continues to follow the grooves in the desired manner. If the latter condition does not always occur, the consequent distortion in reproduction is in any case negligible, since the damping-out time of the pick-up is also comparatively small.

A further improvement in this respect may be obtained by minimising the torsional torque which is exerted on the pick-up during the needle motion. Since the torque is determined by the distance between the needle point and the torsion axis and by the force exerted on the needle point, the latter force being defined for a particular type of pick-up at a given needle pressure, the torque can only be reduced by shortening the coupling arm. It is therefore preferable, as is known per se with other constructions, that the armature axis should be as close as possible to the needle point.

It is in addition advisable to distribute the mass of the head so that in the plane passing through the pivot and the needle point also, the pick-up is at least substantially balanced about the needle point.

This has the advantage that neither the bearing of the pivot nor the bearing of the shaft about which the pick-up is adapted to move as usual in a direction at right angles to the pivot, require accuracy of manufacture, since the weight on the bearings is very low. The said balancing may be employed without inconvenience, since the needle pressure can never exceed the weight of the pick-up, namely about 35 g. In view of the requirement for the needle pressure not to exceed about 25 g., it will be obvious that in many cases, in which the total weight of the pick-up exceeds 25 g., a compromise must be made between the requirements as to the mass distribution and the advantage of constructing the bearing at a minimum cost. Obviously, the balancing is effected while maintaining the requirement as to mass distribution in order to secure the favourable position of the torsion axis.

Piezo-electric pick-up elements are eminently suitable, owing to their flat and generally rectangular shape. Since it is common practice to mount such an element so that its largest faces are parallel with the record to be played, it is not difficult to arrange the spindle, as near as possible to the needle point. Since the mass of the element primarily determines the mass of the head and is substantially symmetrically distributed in a plane passing through the system spindle parallel with the record to be played, the torsion axis will be located in this plane in any case at least approximately. The extent of coincidence of the torsion axis in the first-mentioned plane with the system spindle and of approximation to the ideal condition for the transmission of the needle motion thus only depends on the mass distribution in the head on either side of the plane passing through the pivot and the needle point and on the rigidity of the pick-up arm. Obviously, similar conditions occur with a magnetic pick-up element of flat form.

In a preferred embodiment of the pick-up according to the invention the weight of which is about 8 g., a piezo-electric element is used, which is arranged in an elongated head such that the longitudinal axes of both coincide substantially and the head is secured to a straight arm such that the longitudinal axis of the element is at angle of about 20° with the plane passing through the pivot and the needle point, the system spindle thus being at an angle of about 30° with the pick-up arm. The balancing of the mass on either side of the plane passing through the pivot and the needle point, as required in accordance with the invention which in this case is located on the side of the head remote from the pivot, is ensured by providing an additional weight in the head on one side of this plane preferable at a point which is as remote as possible from the pivot, because this also assists in the balancing in this plane with respect to the needle point.

In order that the invention may be readily carried into effect, a number of examples will now be described in detail with reference to the accompanying drawings in which Fig. 1 is a bottom plan view of one embodiment of the pick-up according to the invention having a weight of about 8 gms.;

Fig. 2 is a lateral view of the pick-up shown in Fig. 1 the head being shown in a sectional view taken on the plane B—B at right angles to the plane of the drawing;

Fig. 2a is a cross-sectional view of the pick-up arm shown in Figs. 1 and 2;

Fig. 3 shows the difference between the frequency characteristic response curve of a pick-up as shown in Figs. 1 and 2 and that of the same pick-up in which mass distribution according to the invention is not employed;

Figs. 4 and 5 show a further embodiment of the pick-up according to the invention in a bottom and a lateral view;

Figs. 6 and 7 show another pick-up according to the invention in a plan view and a lateral view, the arm connecting the foot to the head being curved.

According to Figs. 1 and 2 the flat head 1 of the pick-up is supported by an elongated arm 2, which connects the head to a foot 3, which is adapted to rotate about a pivot 4 at right angles to the record 5 to be played. For the sake of completeness 4a designates the shaft on which the pick-up, as usual, is adapted to rotate in a plane at right angles to the record 5. The head has an electro-mechanical transformation system, comprising a piezo-electric element 6 and a balancing weight 7.

The weight of the pick-up (arm and head) being 8.3 g., it slightly exceeds the needle pressure of about 6 g. Since the piezo-electric element weighs 1.6 g., the balancing weight 2 g. and the weight of the housing of the head is 2.7 g., the mass of the pick-up of 8.3 g. is primarily located in the head. Consequently the mass moment of inertia about the pivot 4 is comparatively very high and, in spite of the small mass of the pick-up, the lateral movements of the pick-up in a plane at right angles to the pivot 4 owing to the scanning movement can be sufficiently restricted, whilst the pressure occurring in the bearing of the pivot 4 is so small that provision may be made of a cheap slide bearing and a balancing spring or a counterweight to ensure that said needle pressure may be dispensed with. For the same reason a simple bearing may be used for pivot 4a.

Owing to the presence of the weight 7, the mass distribution is such that the masses on either side of the plane A—A passing through the pivot 4 and the needle point 9 are at least substantially equal. The weight 7 is furthermore positioned so as to be as remote as possible from the pivot 4, such that the mass of the pick-up is substantially balanced in the plane passing through the pivot and the needle point with respect to this point or at least the mass is distributed such that the pivot exerts a very slight pressure on the associated bearing.

The plane B—B with respect to which the needle oscillates symmetrically during the operation and which is at right angles to the record 5 is at an angle of about 20° with the aforesaid plane A—A, so that with the maintenance of the conventional arm length the tangent line to the unmodulated groove at any point of scan is located substantially in the above mentioned plane of symmetry.

The piezo-electric element 6 is housed in the head so that the direction of the spindle in which the needle holder 10 is journalled, the system spindle 11, coincides with the plane B—B. The needle holder is in addition secured to the crystal 12, which is clamped in at 13. The aforesaid mass distribution and the substantially symmetrical construction of the piezo-electric element with respect to the lengthened spindle 11 ensure that the axis about which the pick-up is torsioned due to the lateral needle motion, the torsion axis 14, is located substantially in a plane passing through the system spindle 11 parallel with the record 5. Since moreover the rigidity of the pick-up arm 2 against torsion owing to the choice of the material and the U-shaped sectional area (Fig. 2a), is slight enough for the torsion resonance frequency determined thereby and by the mass of the pick-up concentrated in the head, to be less than 200 c. p. s., it is ensured that the aforesaid torsion axis 14 coincides at least substantially with the system spindle 11. Since this spindle thus constitutes at least substantially the axis about which the needle point oscillates in practice, the condition in which the needle motion is most effectively transmitted to the transformation system is approximated similarly to the known devices, the system spindle 11 is located as near as possible to the needle point with a view to reducing the moment of the torque.

Fig. 3 shows the difference between the diagrammatically shown frequency characteristic response curve (a) of a pick-up according to the invention and that (b) of a corresponding pick-up, in which the aforesaid mass distribution is not available, since the balancing weight 7 is removed. This shows that in the first-mentioned case in the frequency range of from 500 to 50 c. p. s. the output voltage is higher and the inconvenient resonances have substantially vanished.

Figs. 4 and 5 show a pick-up according to the invention of which the weight (arm and head) is 35 g. and the needle pressure is about 25 g. Since the weight of the flat head, composed of the weight of the piezo-electric element (11 g.), the balancing weight 15 (6 g.) and the weight of the housing of the head (13 g.) is 30 g., the mass of the pick-up is primarily located in the head. The line A—A designates the plane passing through the needle point 16 of the pick-up and the pivot 17 at right angles to the record 18 to be played. Similarly to the previous example, the piezo-electric element 19 is housed in the head such that the system axis 21 coincides with the plane B—B in which the needle oscillates symmetrically. Owing to the configuration of the pick-up the torsion axis 22 will extend approximately as shown in the figure.

Figs. 6 and 7 show a pick-up according to the invention, in which the flat arm 23, which connects the head 24 and the foot 25, is curved. The asymmetry of the mass distribution with respect to the plane A—A passing through the needle point 26 and the spindle 27 of the pick-up, due to the curved shape of the arm and the position of the piezo-electric element, is neutralized by the balancing weight 28. The system spindle 29 of the piezo-electric element 30 is located in the plane B—B, in which the needle oscillates symmetrically, but, owing to the configuration of the pick-up, is not exactly coincident with the torsion axis 31.

What I claim is:

1. A phonograph pick-up comprising a head, a pivot at right angles to a record to be played, an elongated arm connected to said head and adapted to rotate about said pivot, a needle located in said head, the plane relative to which the needle oscillates symmetrically in a lateral direction is at a right angle to the plane of said record to be played and at an angle of less than 30° with a second plane perpendicular to said record and passing through said pivot and said needle, said elongated arm having a low rigidity against torsion thereby giving a mechanical torsion resonance frequency of less than 200 cycles per second, said pick-up having a weight of less than 35 grams with its mass located principally in said head and distributed so that the masses on either side of said second plane are substantially equal.

2. A phonograph pick-up comprising an elongated head, a pivot at right angles to the record to be played, an elongated arm connected to said head and adapted to rotate about said pivot, a piezo-electric element in said head with its longitudinal axis substantially coinciding with the longitudinal axis of said head, a needle located in said head, the plane relative to which the needle oscillates symmetrically in a lateral direction is at a right angle to the plane of said record to be played and at an angle of about 20° with a second plane perpendicular to said record and passing through said pivot and said needle, said elongated arm having a low rigidity against torsion thereby giving a mechanical torsion resonance frequency of less than 200 cycles per second, said pick-up having a weight of less than 15 grams and a balancing weight on one side of said second plane remote as possible from said pivot so that the masses on either side of said second plane are substantially equal.

HUBERTUS JAN SMITS.

References Cited in the file of this patent

UNITED STATES PATENTS

| Number | Name | Date |
|---|---|---|
| 2,060,117 | Proctor | Nov. 10, 1936 |
| 2,308,795 | Vermeulen | Jan. 19, 1943 |
| 2,313,126 | Dally | Mar. 9, 1943 |
| 2,542,534 | John | Feb. 20, 1951 |